United States Patent [19]

Fick

[11] 4,030,164
[45] June 21, 1977

[54] RETENTION DEVICE FOR FILLETING FISH

[76] Inventor: Henry A. Fick, 5138 Kempf, St. Louis County, Mo. 63128

[22] Filed: July 3, 1975

[21] Appl. No.: 593,039

[52] U.S. Cl. .............................................. 17/70
[51] Int. Cl.² ...................................... A22C 25/00
[58] Field of Search ............. 17/70, 44, 66, 69, 53, 17/55, 62, 15, 68, 50, 21; 269/289, 321 A; 248/309, 312, 314; 43/53.5, 54.5 R, 55, 44.2; 119/151; 241/95

[56] References Cited

UNITED STATES PATENTS

| 2,609,024 | 9/1952 | Russ | 269/289 |
|---|---|---|---|
| 2,756,457 | 7/1956 | Banowetz, Sr. | 17/70 |
| 2,932,849 | 4/1960 | Missman | 17/70 |
| 2,997,805 | 8/1961 | Havemeyer | 43/53.5 |
| 3,237,240 | 3/1966 | Bednar et al. | 17/70 |
| 3,727,269 | 4/1973 | Snead | 17/70 |
| 3,833,967 | 9/1974 | Kieser | 17/70 |

Primary Examiner—Louis G. Mancene
Assistant Examiner—Robert P. Swiatek
Attorney, Agent, or Firm—Ralph W. Kalish

[57] ABSTRACT

A retention device for filleting fish comprising a flat surface-forming, elongated body for supporting the fish to be filleted. The body is provided adjacent its forward end with a curvate opening, the bight portion of which extends forwardly of the body, and having a forward and rearward edge portions. The curvature of the opening is generally the same as the anterior edge of the external gill openings of a fish whereby the gill openings are receivable within the opening. The body opening rearward edge is provided with a series of serrations or corrugations for wedging engagement within the individual gill ports of the received fish for maintaining the same stably in position on the body during filleting.

11 Claims, 5 Drawing Figures

U.S. Patent      June 21, 1977      4,030,164
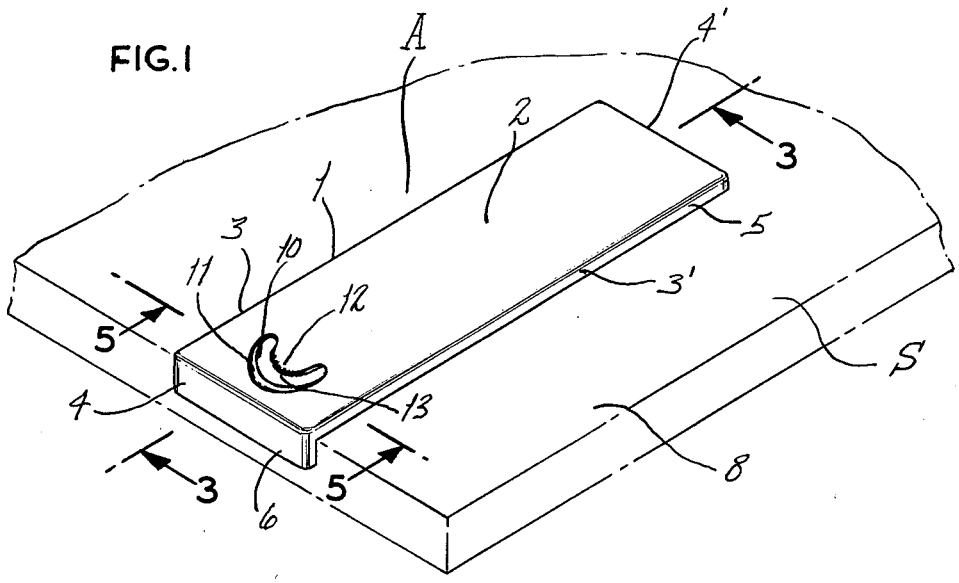
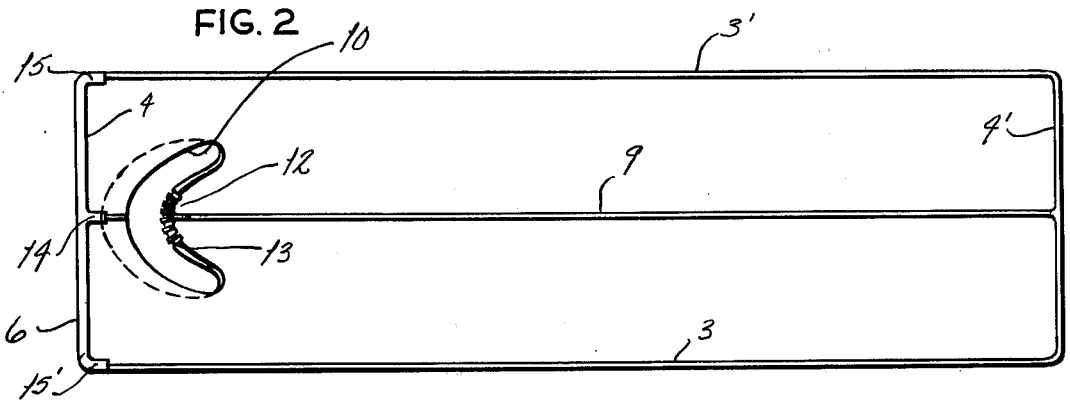
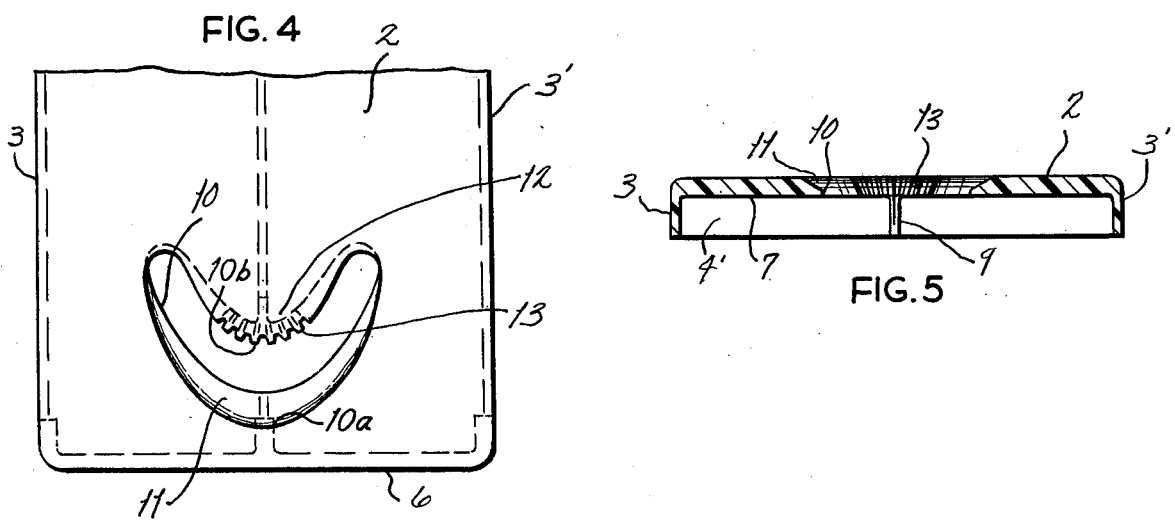

4,030,164

RETENTION DEVICE FOR FILLETING FISH

BACKGROUND AND SUMMARY OF THE INVENTION

This invention relates in general to fish dressing and, more particularly, to certain new and useful improvements in a device for retaining a fish for filleting.

Heretofore, numerous expedients have been attempted for maintaining a fish in relatively stable condition during dressing thereof and particularly for steaking or filleting. However, such previous attempts have uniformly incorporated positive gripping components, such as clamps and the like, for effecting a secure hold upon the fish to inhibit displacement during the dressing operation. Devices incorporating clamps for engaging the tail of the fish are exemplified by the Gaultney U.S. Pat. No. 2,795,814 and Bowe U.S. Pat. No. 1,438,091, while the Thornton U.S. Pat. No. Re. 24,194 embodies clamps for engaging both the head and the tail of the fish so as to place a longitudinal tension thereon. A further expedient is shown in the Snead U.S. Pat. No. 3,727,269 wherein the combination of a clip for engaging the head and a plurality of prongs for partial penetration of the fish tail are utilized. An additional concept is demonstrated by the Engle U.S. Pat. No. 2,913,760 wherein a template for fully enclosing the fish within a defined compartment is utilized and has knife-directing openings with the opposed walls of the template. Accordingly, prior art efforts have been directed to providing extrinsic mechanical components for bringing about a positive engagement of the fish with such components as distinguished from the concept of effectively utilizing anatomical features of the fish for inter-relationship with the retention device whereby a considerably simplified structure may be effective.

Therefore, it is an object of the present invention to provide a device for retaining a fish firmly in position for filleting or steaking, which is devoid of the incorporation of extrinsic fish gripping elements.

It is another object of the present invention to provide an apparatus of the type stated which may be integrally formed from a single material of concentration and is devoid of any moving or otherwise mechanically operable elements so that the same may be economically produced upon a high volume basis.

It is a still further object of the present invention to provide an apparatus of the type stated which may be reliably and efficiently utilized by the average unskilled individual so that instructions in operational usage are unnecessary and with such devices having an absence of any components which through accident might be potentially harmful to the user.

It is another object of the present invention to provide a device of the character stated which may be designed for accommodating fish of any preselected size.

It is a still further object of the present invention to provide a device of the character stated which is of integral formation so as to be resistant to breakage and, hence, ammenable to long, hard wear.

BRIEF DESCRIPTION OF THE DRAWING

FIG. 1 is a perspective view of a retention device for filleting fish constructed in accordance with and embodying the present invention, illustrating same in mounted operative position upon a suitable support.

FIG. 2 is a bottom plan view.

FIG. 3 is a vertical transverse sectional view of the retention device taken on the line 3—3 of FIG. 1, but omitting reference to the support surface.

FIG. 4 is an enlarged fragmentary top plan view of the fish engaging end of said device.

FIG. 5 is a horizontal transverse sectional view taken on the line 5—5 of FIG. 1, but omitting reference to the support surface.

DESCRIPTION OF THE PREFERRED EMBODIMENT

Referring now by reference numerals to the drawing which illustrates the preferred embodiment of the present invention, A designates a device for retaining fish during the filleting or steaking operation and comprises a body 1 integrally formed, as by molding, from a suitable plastic material, such as a thermosetting composition, but which, obviously, could easily be constructed of wood or metal, if desired. Said body 1 is of generally elongate planar form as in the general nature of a board having a top or fish-receiving surface 2 having opposed side edges 3,3', and forward and rearward end edges 4,4'. Said last mentioned edges are continuous with a depending coextensive peripheral skirt 5, but which at the forward end 4 is of relatively increased length so as to develop an abutment 6. Said skirt 5 serves a duality of purposes in that it understandably provides strength to body 1 so as to resist any undesired deformation thereof in order that the said surface 2 may retain its uniplanar character; as well as serving as a limited spacer so that the under surface, as at 7, of body 1 will be spaced from the upper surface of a flat support member 8 which may be a table top, workbench, or the like.

With reference to FIG. 1 it will be seen that said body will, in operation, be mounted upon such support surface 8 and with abutment 6 engaging on its inner surface the confronting edge portion of said support surface 8 so as to thereby limit any axial shifting of body 1 during usage in a direction away from the engaged end of said support surface 8 and thereby conduce to the stability of body 1 during filleting.

Centrally of its under surface 7, body 1 is provided with a preferably central, depending reinforcing rib 9 which promotes the overall rigidity of said body 1 and concurrently permits of relative reduction in the use of the material of construction without loss of distortion resistance.

Provided in surface 2, preferably transversely centrally thereof, and in immediate adjacency to forward end edge 4, is a generally curvate opening 10 which in actuality is of asymptotic character as the same is not formed on a constant radius, nor is the same of ovate curvature. Thus, the said opening 10 might be considered as conforming broadly to the curvature of the anterior edge of the external gill opening of the fish to be filleted. Adjacent the forward edge 10a of said opening 10, the surface 2 is downwardly and rearwardly inclined, as at 11, to form a relatively shallow recess for accepting the overlying head portion of the fish which would be just forwardly of the said anterior edge. In its central or forwardly projecting portion, as at 12, the rearward edge 10b of said opening 10 is provided with a series of serrations or corrugations 13 which incline slightly downwardly and rearwardly, as may best be seen in FIGS. 2 and 5. It will, of course, be apparent that reinforcing rib 9 is interrupted by said opening 10 (see FIG. 2).

In actual usage, body 1 is placed upon a suitable support surface, as indicated at S, which may be a table top, workbench, or like stable planar member, with abutment 6 depending beyond the adjacent forward end of said surface S so that rearwardly extending central and edge members of said abutment 6, as at 14, 15, 15', will be brought into meeting contact with such surface forward edge so as to stablize device A in position and restrain same against movement longitudinally thereof away from said surface forward edge. Thus, said device A is in firm, supported position for usage.

The operator will then place the fish to be filleted flatwise upon one of its sides upon surface 2 and with the head at the forward end of said latter. The user will then cause the external gill opening or operculum, on the now underside of the fish, to be received within board opening 10. that is, with the anterior edge of said gill openings lying beneath the immediately adjacent portion of said board and with said board serrations 13 extending forcibly into the external gill opening and the within the gill ports. This disposition is facilitated by reason of recess 11 which directs the inner side of the external gill opening downwardly so as to direct said gill ports toward said board serrations 13. It will be observed that the serrations 13 will thus be forced into a tight engagement within the gill ports and thereby effect a secure, locked retention of the fish against inadvertent shifting or displacement during the succeeding filleting operation. With the fish so disposed the filleting operation may be effected in the usual manner.

It may further be observed that in the event a fillet were to become separated from the fish, the user could insert the tail skin within the opening 10 and hold same against serrations 13 to render more easy the succeeding skinning action.

From the foregoing it will thus appear that the present invention is one of marked simplicity, being integrally formed from a single material of construction, and being devoid of any moving or operating parts. Device A uniquely relies upon the interengagement between the fish's anatomy and portions of the board which are particularly contour for complementary securement with the fish. Thus, device A represents an adaptation to the anatomy of a fish for retention purposes as distinguished from the art heretofore known wherein well known mechanical expedients were resorted to for clampingly engaging portions of the fish.

Having described my invention, what I claim and desire to obtain by Letters Patent is:

1. A device for retaining a fish during filleting operation thereon comprising a rigid, flat, elongate body having a forward end portion and a rearward end portion, the length of said body being commensurate with that of the fish to be accommodated for supporting same thereon upon one of the sides of the fish; means provided on said body for engaging the fish to be filleted to maintain same against displacement during filleting, said means consisting essentially of an opening provided within the forward end portion of said body, said opening being of curvate configuration with forward and rearward edges having the central portions thereof in spaced-apart, confronting relationship, said front and rear edges merging rearwardly of the central portion of said rearward edge, said opening having the bight thereof extending forwardly of said body, the curvature of said opening substantially corresponding to the anterior edge of the external gill openings of the fish to be filleted, said body opening being dimensioned for extension therethrough of the adjacent external gill opening or operculum of the fish, and with said opening rearward edge presented for projection within the gill ports of the adjacent gill opening whereby a secure fish-retaining engagement is effected by said body.

2. A device for retaining a fish during filleting operation as defined in claim 1 and further characterized by said body having a planar support surface for the fish to be filleted, there being a depending marginal flange provided on said body permitting of clearance of the portion of the fish projecting through said opening.

3. A device for retaining a fish during filleting operation as defined in claim 1 and further characterized by there being a shallow, upwardly opening recess formed in said body adjacent the forward edge of said opening for receiving the overlying portion of the fish to be filleted.

4. A device for retaining a fish during filleting operation as defined in claim 3 and further characterized by said recess being coextensive with the forward edge of said body opening and inclining downwardy and rearwardly in the upper portion of said opening.

5. A device for retaining a fish during filleting operation as defined in claim 1 and further characterized by said body having at its end forwardly of said opening a depending flange-forming abutment.

6. A device for retaining a fish during filleting operation as defined in claim 5 and further characterized by said body being unitarily formed from a single material of construction.

7. A device for retaining a fish during filleting operation as defined in claim 1 and further characterized by said opening rearward edge portion being provided centrally with a series of serrations enhancing the enngagement with said external gill opening gill ports thereby conducing to the stable maintenance of the fish during the filleting operation.

8. A device for retaining a fish during filleting operation as defined in claim 7 and further characterized by said serrations extending in a substantially vertical direction, but being inclined downwardly and rearwardly from their upper ends.

9. A device for retaining a fish during filleting operation as defined in claim 1 and further characterized by at least a portion of said rearward edge portion of said opening being serrated, and said opening rearward edge portion inclining downwardly and rearwardly from its upper end.

10. A device for retaining a fish during filleting operation consisting essentially of a rigid body having an elongated upper planar portion for supporting a fish on its side, means formed integrally with said body for supporting said planar portion elevatedly above a support surface, said planar portion having a forward end and a rearward end, there being proximate the forward end of said planar portion an opening having forwardly projecting curvate forward and rearward complementarily formed edges, said edges being convex in a direction forwardly of said planar portion, said rearward edge being downwardly and rearwardly inclined from its upper end and to its lower end, said forward edge having an upwardly opening recess in its upper portion, said opening being sized to receive the operculum of the supported fish.

11. A device for retaining a fish during filleting operation as defined in claim 10 and further characterized by the curvature of said opening being of asymptotic character.

* * * * *